(12) United States Patent
Caklovic (10) Patent No.: US 8,224,789 B1
(45) Date of Patent: Jul. 17, 2012

(54) METHODS AND SYSTEMS FOR SAFELY RESTORING FILES IN A COMPUTING SYSTEM

(75) Inventor: Nenad Caklovic, Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 329 days.

(21) Appl. No.: 12/402,947

(22) Filed: Mar. 12, 2009

(51) Int. Cl.
*G06F 17/30* (2006.01)

(52) U.S. Cl. ......................... 707/674; 707/679

(58) Field of Classification Search .......... 707/780–788, 707/637–654, 661–686
See application file for complete search history.

(56) References Cited

U.S. PATENT DOCUMENTS

| | | | |
|---|---|---|---|
| 7,860,836 B1 * | 12/2010 | Natanzon et al. | 707/648 |
| 7,886,291 B1 * | 2/2011 | Jones et al. | 717/174 |
| 7,890,963 B2 * | 2/2011 | Sanders | 719/328 |
| 7,904,428 B2 * | 3/2011 | Perry et al. | 707/677 |
| 7,917,475 B2 * | 3/2011 | D'Souza et al. | 707/656 |
| 7,970,789 B1 * | 6/2011 | Blaser et al. | 707/783 |
| 8,001,085 B1 * | 8/2011 | Kiselev | 707/639 |
| 2002/0056031 A1 * | 5/2002 | Skiba et al. | 711/162 |
| 2002/0178271 A1 * | 11/2002 | Graham et al. | 709/229 |
| 2003/0233647 A1 * | 12/2003 | Blaser et al. | 717/174 |
| 2005/0097143 A1 * | 5/2005 | Pudipeddi et al. | 707/200 |
| 2005/0257265 A1 * | 11/2005 | Cook et al. | 726/23 |
| 2007/0083522 A1 * | 4/2007 | Nord et al. | 707/10 |
| 2008/0010630 A1 * | 1/2008 | Ou-Yang et al. | 717/121 |
| 2009/0019459 A1 * | 1/2009 | Rowan et al. | 719/328 |
| 2009/0126003 A1 * | 5/2009 | Touboul | 726/13 |
| 2009/0198805 A1 * | 8/2009 | Ben-Shaul et al. | 709/222 |
| 2010/0037235 A1 * | 2/2010 | Larimore et al. | 719/312 |
| 2010/0106685 A1 * | 4/2010 | Ott et al. | 707/611 |

* cited by examiner

*Primary Examiner* — Wilson Lee
(74) *Attorney, Agent, or Firm* — Advantedge Law Group (57) ABSTRACT

A method to for safely restoring files in a computing system may include: 1) identifying a backup copy of a file, 2) creating a virtualization layer on a storage device in the computing system, and 3) restoring the backup copy of the file to a virtualized location within the virtualization layer. The method may also include determining whether redirecting a call, initially directed to an original location of the file, to the virtualized location would adversely affect the computing system. The method may further include performing, based on the results of the determination, a file-system operation. Various other methods, systems, and computer-readable-storage media are also disclosed.

20 Claims, 5 Drawing Sheets

METHODS AND SYSTEMS FOR SAFELY RESTORING FILES IN A COMPUTING SYSTEM

BACKGROUND

Consumers and businesses increasingly rely on computers to perform tasks and store data. A backup system may improve the reliability of a computing system by allowing a user to return a file, such as a data file, a system file, or an application file, to a previous state. For example, if a file is corrupted, unintentionally deleted, or otherwise unintentionally changed, the backup system may recover a previous version of the file.

Various backup systems may allow a user to recover a previous version of a file by copying the previous version to the original location of the file, overwriting any current version of the file. However, this conventional file recovery process may cause data loss or system instability. For example, if the copy of the previous version of the file is corrupt, the backup system may overwrite the current version of the file with a corrupt version of the file. If the file is a data file, this may result in data loss. If the file is a system or application file, this may result in system instability.

SUMMARY

The instant disclosure is directed to methods and systems for safely restoring files in a computing system. In some embodiments, a method for performing this task may include: 1) creating a virtualization layer on a storage device in a computing system, 2) restoring a backup copy of a file to a virtualized location within the virtualization layer, 3) determining whether redirecting a call, initially directed to the original location of the file, to the virtualized location would adversely affect the computing system, and then 4) performing a file-system operation based on this determination. Examples of suitable file-system operations that may be performed include, without limitation, restoring the backup copy of the file to the original location, redirecting subsequent calls directed to the original location to the virtualized location, and/or allowing subsequent calls directed to the original location to access the original location.

The system may determine whether redirecting the call would adversely affect the computing system in a variety of ways. For example, the system may determine that redirecting the call would adversely affect the computing system by determining that the backup copy of the file is corrupt or by determining that redirecting the call would cause data loss, system instability, configuration errors, or incompatibilities.

The system may also determine that redirecting the call would adversely affect the computing system by comparing the backup copy to a known good copy of the file, by determining whether the contents of the file adhere to a specified file format, or by scanning the backup copy of the file for malware. In addition, the system may determine that redirecting the call would adversely affect the computing system by presenting the backup copy of the file to a user and receiving input from the user regarding the integrity of the backup copy. These and other embodiments will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Embodiments of the present disclosure provide various methods and systems for safely restoring files in a computing system. For example, embodiments of the present disclosure may use one or more modules to restore a file to a virtualized location and then determine whether to direct calls to the file to the virtualized location. One or more modules may then perform a file-system operation by, for example, directing subsequent calls or restoring the file to the original location.

Embodiments of the present disclosure may provide various features and advantages not provided by traditional technologies. For example, methods and systems described herein may allow a user to restore files without risking data loss or system instability. Additionally, some embodiments described herein may allow a user to access and manipulate previous versions of files before permanently restoring them or after terminating their provisional restoration. These and other embodiments, features, and advantages will be more fully understood upon reading the following detailed description in conjunction with the accompanying drawings and claims.

Figure 1:
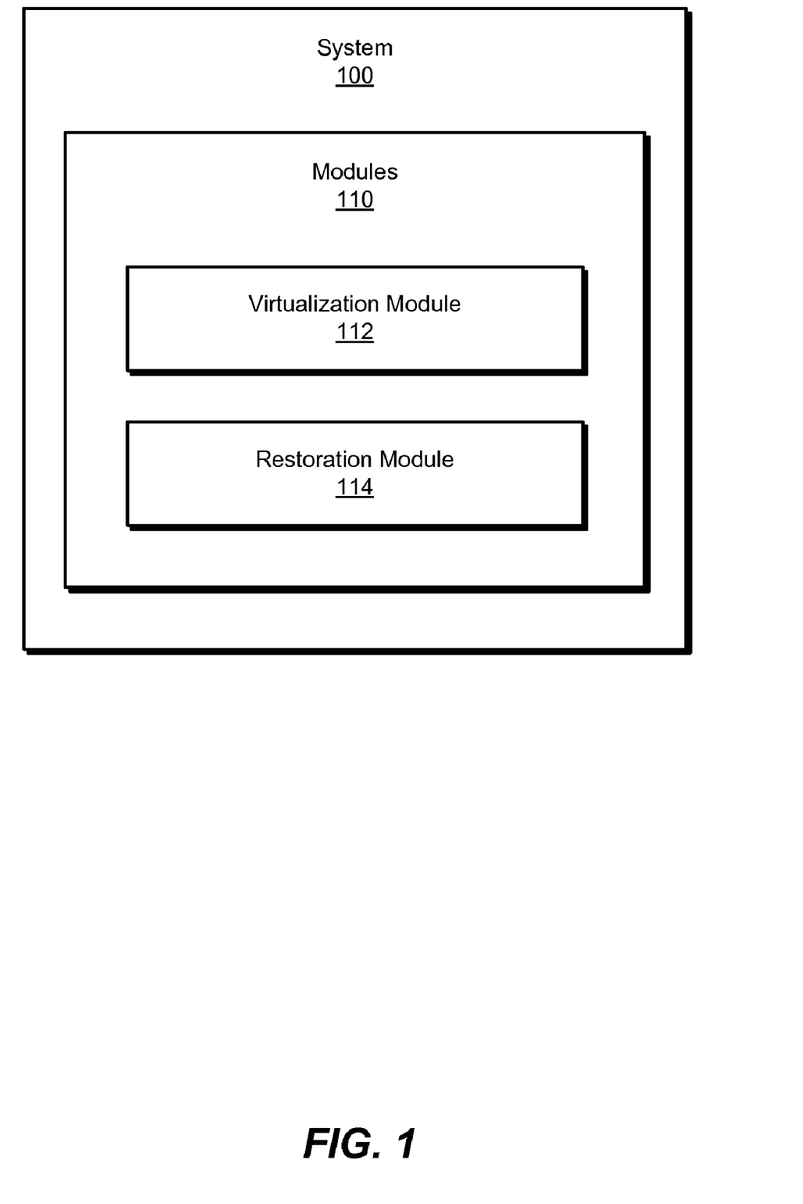
FIG. 1 is a block diagram of an exemplary system for safely restoring files in a computing system.

FIG. 1 illustrates an exemplary system 100 for safely restoring files in a computing system. As illustrated in this figure, system 100 may include one or more modules 110. Modules 110 may include a virtualization module 112 and a restoration module 114. As will be explained in greater detail below, virtualization module 112 may be programmed to identify a backup copy of a file, create a virtualization layer on a storage device in the computing system, and restore the backup copy of the file to a virtualized location within the virtualization layer. Restoration module 114 may be programmed to determine whether redirecting a call, initially directed to an original location of the file, to the virtualized location would adversely affect the computing system. Restoration module 114 may be further programmed to perform a file-system operation based on the results of the determination.

In certain embodiments, one or more of modules 110 in FIG. 1 may represent one or more software applications or programs that, when executed by a computing system, may cause the computing system to perform one or more of the steps disclosed herein. For example, as will be described in greater detail below, one or more of modules 110 may represent software modules configured to run on one or more computing devices, such as computing system 410 in FIG. 4 and/or portions of exemplary network architecture 500 in FIG. 5. One or more of modules 110 in FIG. 1 may also represent all or portions of one or more special-purpose computers configured to perform one or more tasks associated with the steps disclosed herein.

Figure 2:
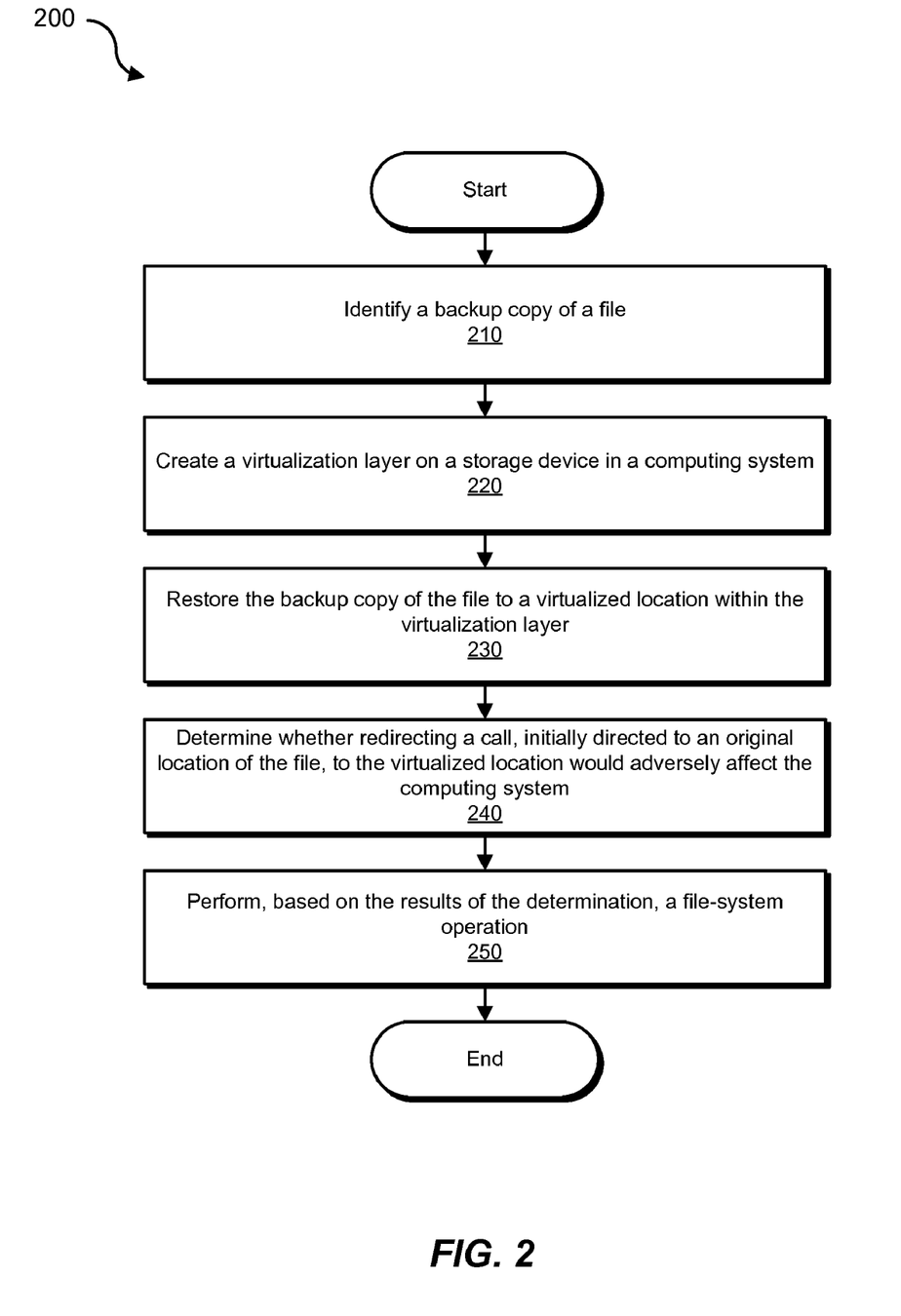
FIG. 2 is a flow diagram of an exemplary method for safely restoring files in a computing system.

FIG. 2 illustrates an exemplary method 200 for safely restoring files in a computing system. In some examples, the steps in FIG. 2 may be performed by one or more of modules 110 in FIG. 1. For example, at step 210 in FIG. 2 virtualization module 112 in FIG. 1 may identify a backup copy of a file. Virtualization module 112 may identify the backup copy of the file in any suitable manner. For example, virtualization module 112 may identify the backup copy of the file by locating it on an internal or external backup storage device, receiving it from another module, and/or by creating the backup copy of the file.

At step 220, virtualization module 112 may create a virtualization layer on a storage device in the computing system. Virtualization module 112 may create the virtualization layer in a variety of ways. In one example, virtualization module 112 may create the virtualization layer through virtualization software, such as ALTIRIS SOFTWARE VIRTUALIZATION SOLUTION (ALTIRIS SVS). Additionally or alternatively, virtualization module 112 may create the virtualization layer through a unification file system, such as UNIONFS.

As used herein, the phrase "virtualization layer" may refer to any technology that allows a file to reside at one location in a file system and be presented at another location in the file system. In some embodiments, the location where the file resides may be private (i.e., set apart for the purpose of virtualization). For example, a virtualization layer may include a directory called /layer. In this example, the virtualization layer may allow a file at the virtualized location /layer/bin/file1 to be visible at the location /bin/file1.

Returning to FIG. 2, at step 230 virtualization module 112 may restore the backup copy of the file to a virtualized location within the virtualization layer. Virtualization module 112 may restore the backup copy of the file to the virtualized location in any suitable manner. For example, virtualization module 112 may retrieve the backup copy of the file from an internal or external storage device, such as a hard drive or a magnetic tape drive. Virtualization module 112 may then instruct virtualization software, such as ALTIRIS SVS, to write the backup copy of the file at the virtualized location. Additionally or alternatively, virtualization module 112 may restore the backup copy of the file to the virtualized location by copying the backup copy of the file directly from a backup storage device, such as a magnetic tape drive, to the virtualized location.

Returning to FIG. 2, at step 240 restoration module 114 may determine whether redirecting a call to the virtualized location would adversely affect the computing system. In step 240, the call may be any call initially directed to an original location of the file. For instance, the call may be an attempt by an application and/or a system module to access the file at its original location, a call that virtualization module 112 has intercepted and redirected to the virtualized location, or a potential future call that has yet to occur.

Restoration module 114 may determine whether redirecting the call to the virtualized location would adversely affect the computing system in a variety of ways. In some embodiments, restoration module 114 may determine that redirecting the call would adversely affect the computing system by determining that there is a problem with the backup copy of the file.

For example, restoration module 114 may determine that there is a problem with the backup copy of the file by determining that the backup copy of the file is corrupt. Restoration module 114 may determine that the backup copy of the file is corrupt in variety of ways, including, for example, by receiving information about the integrity of the backup copy of the file from a backup system, such as BACKUP EXEC, by determining that the backup copy of the file fails to match an expected checksum, or through any other suitable method.

Restoration module 114 may also detect a problem with the backup copy of the file through a variety of additional methods. For example, restoration module 114 may compare the backup copy of the file to a known good copy of the file. The known good copy of the file may include a secondary backup copy of the file and/or a remote copy of the file stored on a centralized server. If the backup copy of the file differs from the known good copy of the file, restoration module 114 may determine that redirecting the call to the virtualized location would adversely affect the computing system. In another example, restoration module 114 may detect a problem with the backup copy of the file by determining that the contents of the backup copy of the file do not adhere to a specified file format. For instance, if the backup copy of the file is an executable file, but the contents of the file do not match the executable file format, restoration module 114 may determine that redirecting the call to the virtualized location would adversely affect the computing system. Restoration module 114 may also detect a problem with the backup copy of the file by scanning for and detecting malware in the backup copy of the file.

Aside from determining that the backup copy of the file is corrupt or in an unexpected state, restoration module 114 may determine there is a problem with the backup copy of the file by presenting the backup copy of the file to a user and then receiving input from the user regarding the integrity of the backup copy of the file. For example, restoration module 114 may present a document file to the user for visual inspection, along with a dialog box allowing the user to input whether the document appears to be intact.

Restoration module 114 may also determine that redirecting the call to the virtualized location would adversely affect the computing system by detecting or anticipating any number of adverse effects. Such adverse effects may include data loss, instability of the computing system, configuration errors, or incompatibilities between system components. For example, restoration module 114 may determine that redirecting the call to the virtualized location would cause data loss if a backup copy of a data file is corrupt but a copy of the file at the file's original location is not. Similarly, restoration module 114 may determine that redirecting the call to the virtualized location would cause instability of the computing system if a backup copy of a system file is corrupt but a copy of the file at the file's original location is not.

In addition, restoration module 114 may determine that redirecting the call to the virtualized location would cause a configuration error if a backup copy of a configuration file is corrupt but a copy of the file at the file's original location is not or if the backup copy of the configuration file corresponds to an old version of an application that has since been replaced on the computing system by a new version of the application.

Similarly, restoration module 114 may determine that redirecting the call to the virtualized location would cause an incompatibility between system components if restoration module 114 determines that a backup copy of a library file corresponds to an old version of the library but that an application currently depends on a newer version of the library file.

Returning to FIG. 2, after restoration module 114 determines whether redirecting the call to the virtualized location would adversely affect the computing system at step 240, at step 250 restoration module 114 may perform a file-system operation based on the results of the determination. Upon completion of step 250, exemplary method 200 in FIG. 2 may terminate.

Restoration module 114 may perform a variety of file-system operations in order to ensure safe file restoration. For example, if restoration module 114 determines that redirecting the call to the virtualized location would adversely affect the computing system, restoration module 114 may direct subsequent calls for the file to the original location of the file by, for example, configuring virtualization module 114 and/or virtualization software to stop redirecting calls initially directed to the original location of the file to the virtualized location.

Alternatively, if restoration module 114 determines that redirecting the call to the virtualized location would not adversely affect the computing system, restoration module 114 may perform a file-system operation that ensures long-term restoration of the backup copy of the file. For example, restoration module 114 may restore the backup copy of the file to the original location.

Restoration module 114 may restore the backup copy of the file to the original location in any suitable manner. For example, restoration module 114 may copy the backup copy of the file from the virtualized location to the original location. In another example, restoration module 114 may redirect subsequent calls initially directed to the original location of the file to the virtualized location, by, for example, configuring virtualization module 112 and/or virtualization software to redirect the subsequent calls.

Figure 3:
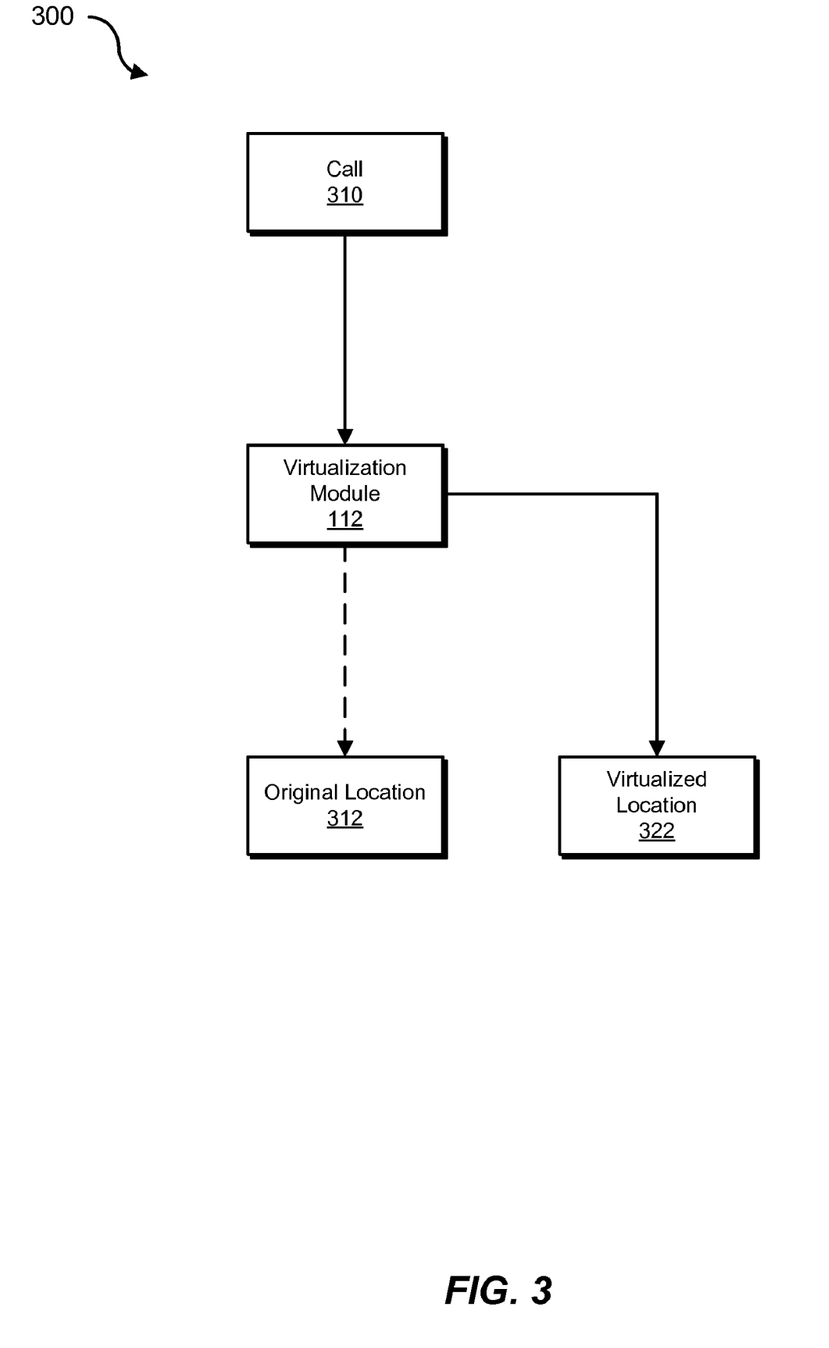
FIG. 3 is block diagram showing file virtualization according to certain embodiments.

For the sake of clarity, and by way of example only, the following will provide, with reference to FIG. 3, an illustration of how exemplary method 200 may be implemented. In FIG. 3, call 310 may represent a call to a file. The call may be any attempt by a computing system to access a file for any purpose. In addition, original location 312 may represent the original location of the file, while virtualized location 322 may represent a location within a virtualization layer to which a backup copy of the file has been restored. In this example, virtualization module 112 may intercept call 310 and either allow call 310 to access original location 312 or redirect call 310 to access virtualized location 322.

For example, a file data1 may have previously been backed up using backup software, such as BACKUP EXEC. In this example, call 310 may be an attempt to access data1 at its original location, /usr/data/data1. In addition, virtualization module 112 may have created a virtualization layer with a virtualization technology, such as ALTIRIS SVS. In this example, the path of the virtualization layer may be /layera. Accordingly, the virtualized location of the file, virtualized location 322, may be /layera/usr/data/data1.

In this example, restoration module 114 may determine whether redirecting call 310 to virtualized location 322 would adversely affect the computing system. For example, if restoration module 114 determines that the backup copy of the file at /layera/usr/data/data1 is corrupt, restoration module 114 may configure virtualization module 112 to direct call 310 to original location 312. Alternatively, if restoration module 114 determines that redirecting call 310 to virtualized location 322 would not adversely affect the computing system, restoration module 114 may direct call 310 to virtualized location 322. Further, restoration module 114 may configure virtualization module 112 to redirect subsequent calls to virtualized location 322. Alternatively, restoration module 114 may copy the file from virtualized location 322 to original location 312.

As detailed above, the methods and systems described herein may allow a user to restore files without risking data loss or system instability. Additionally, some embodiments described herein may allow a user to access and manipulate previous versions of files before permanently restoring them or after terminating their provisional restoration. As such, embodiments of the present disclosure may provide various features and advantages not provided by traditional technologies.

In some examples, the various methods and systems for safely restoring files described herein may transform a storage device into a different state. For example, before being transformed, a storage device may allow access to files, the backing up of files, and the restoration of files. In this example, the methods and systems described herein may transform the storage device to include a virtualization layer configured to facilitate the restoration of files with a reduced risk of data loss or system instability.

Figure 4:
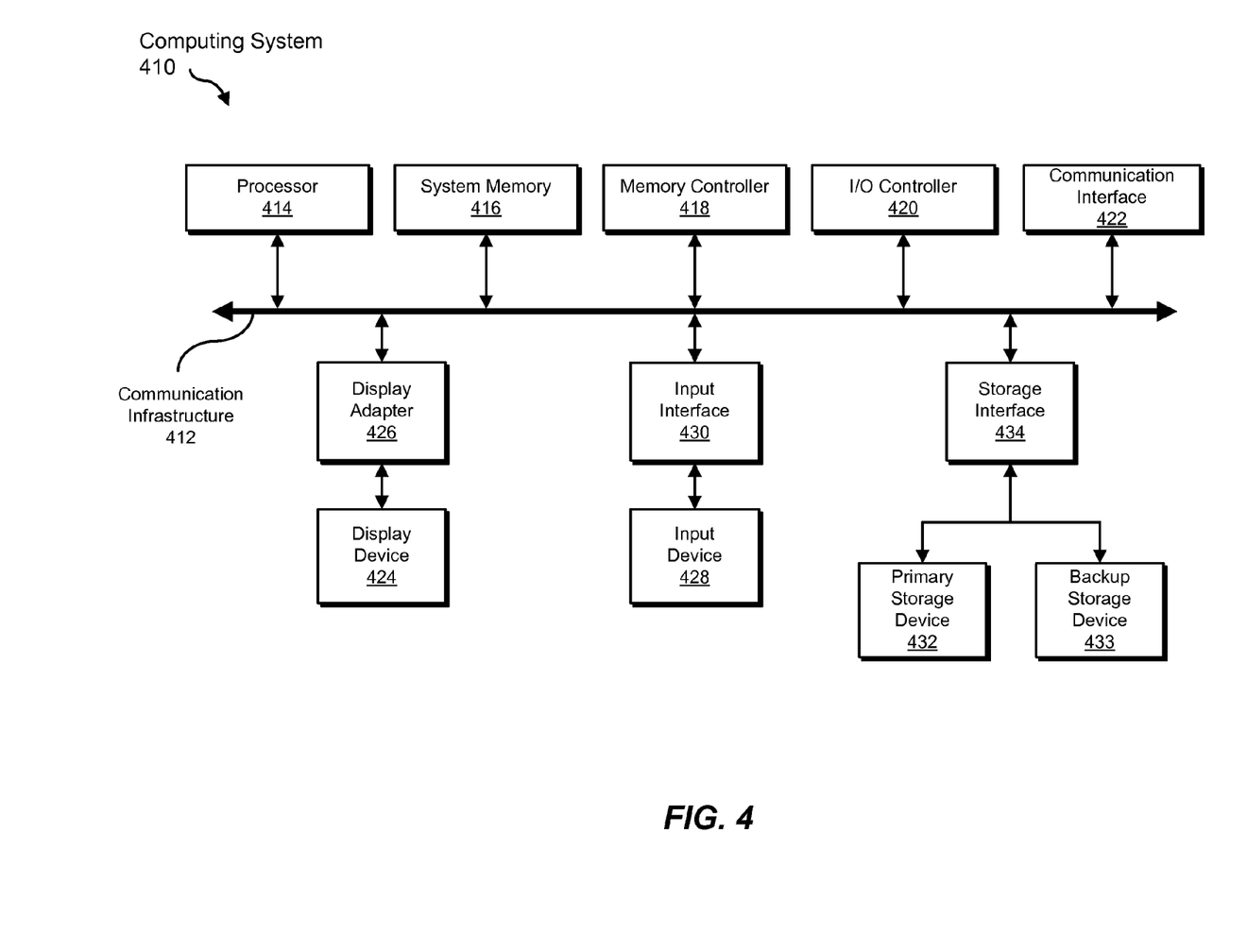
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may comprise at least one processor 414 and system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the identifying, creating, restoring, determining, performing, intercepting, redirecting, comparing, scanning, presenting, and/or receiving steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may comprise both a volatile memory unit (such as, for example, system memory 416) and a non-volatile storage device (such as, for example, primary storage device 432, as described in detail below).

In certain embodiments, exemplary computing system 410 may also comprise one or more components or elements in addition to processor 414 and system memory 416. For example, as illustrated in FIG. 4, computing system 410 may comprise a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller 418 may perform and/or be a means for performing, either alone or in combination with other elements, one or more of the steps or features described and/or illustrated herein, such as identifying, creating, restoring, determining, performing, intercepting, redirecting, comparing, scanning, presenting, and/or receiving.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for identifying, creating, restoring, determining, performing, intercepting, redirecting, comparing, scanning, presenting, and/or receiving steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network comprising additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution. In certain embodiments, communication interface 422 may perform and/or be a means for performing, either alone or in combination with other elements, one or more of the identifying, creating, restoring, determining, performing, intercepting, redirecting, comparing, scanning, presenting, and/or receiving steps disclosed herein. Communication interface 422 may also be used to perform and/or be a means for performing other steps and features set forth in the instant disclosure.

As illustrated in FIG. 4, computing system 410 may also comprise at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also comprise at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the identifying, creating, restoring, determining, performing, intercepting, redirecting, comparing, scanning, presenting, and/or receiving steps disclosed herein. Input device 428 may also be used to perform and/or be a means for performing other steps and features set forth in the instant disclosure.

As illustrated in FIG. 4, exemplary computing system 410 may also comprise a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also comprise other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Storage devices 432 and 433 may also be used, for example, to perform and/or be a means for performing, either alone or in combination with other elements, one or more of the identifying, creating, restoring, determining, performing, intercepting, redirecting, comparing, scanning, presenting, and/or receiving steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
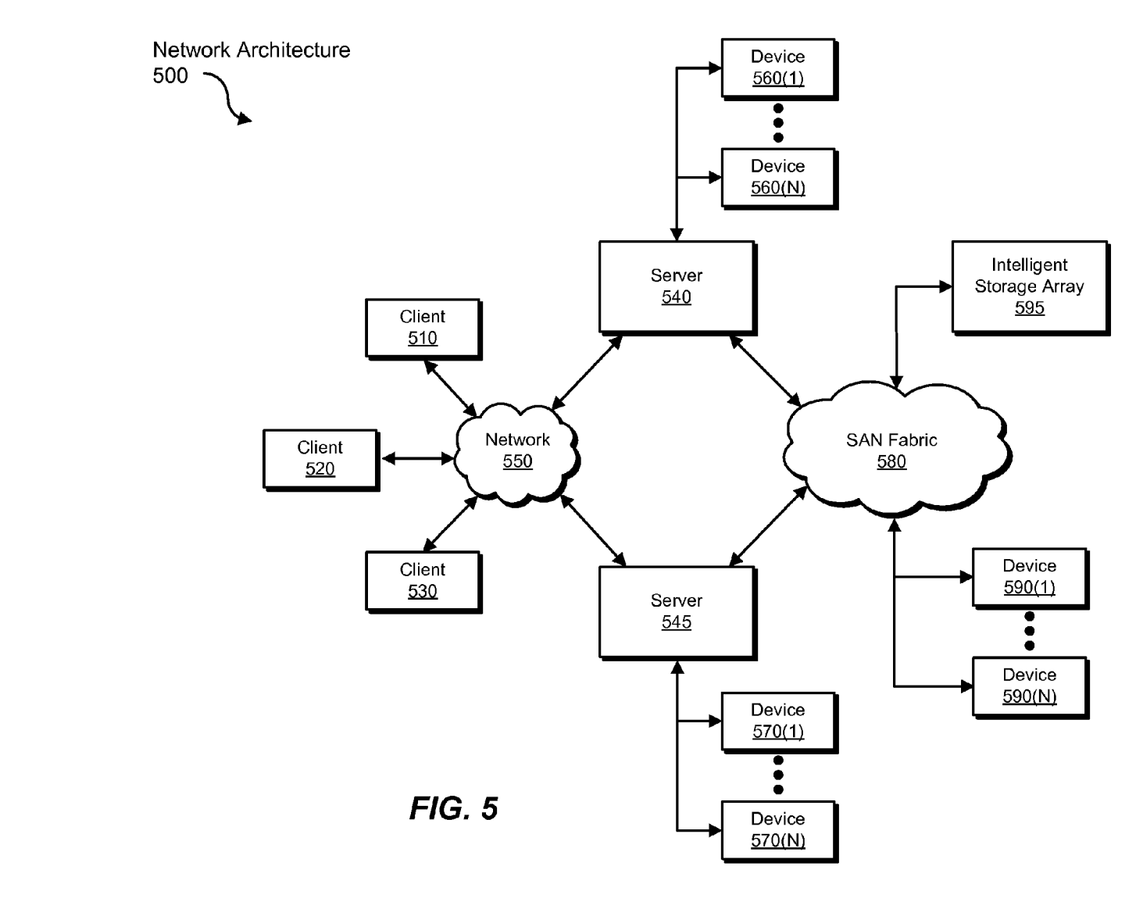
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or to run certain software applications. Network 550 generally represents any telecommunication or computer network; including, for example, an intranet, a wide area network (WAN), a local area network (LAN), a personal area network (PAN), or the Internet.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550. Accordingly, network architecture 500 may perform and/or be a means for performing, either alone or in combination with other elements, one or more of the identifying, creating, restoring, determining, performing, intercepting, redirecting, comparing, scanning, presenting, and/or receiving steps disclosed herein. Network architecture 500 may also be used to perform and/or be a means for performing other steps and features set forth in the instant disclosure.

As detailed above, computing system 410 and/or one or more of the components of network architecture 500 may perform and/or be a means for performing, either alone or in combination with other elements, one or more steps of the exemplary methods described and/or illustrated herein. For example, a computing system (e.g., computing system 410 and/or one or more of the components of network architecture 500) may perform a computer-implemented method for safely restoring files in a computing system. The computing system may identify a backup copy of a file, create a virtualization layer on a storage device in the computing system, and restore the backup copy of the file to a virtualized location within the virtualization layer. The computing system may then determine whether redirecting a call, initially directed to an original location of the file, to the virtualized location would adversely affect the computing system. The computing system may then perform a file-system operation based on the results of the determination. According to some embodiments, the computing system may intercept the call and redirect the call from the original location to the virtualized location.

In some embodiments, identifying the backup copy of the file may comprise creating a backup copy of the file. According to various embodiments, determining whether redirecting the call would adversely affect the computing system may comprise determining that redirecting the call did not adversely affect the computing system. According to some embodiments, determining whether redirecting the call would adversely affect the computing system may comprise determining that redirecting the call adversely affected the computing system.

In certain embodiments, performing the file-system operation may comprise redirecting, to the virtualized location, subsequent calls directed to the original location. In some embodiments, performing the file-system operation may comprise restoring the backup copy of the file to the original location. In some embodiments, performing the file-system operation may comprise allowing subsequent calls directed to the original location to access the original location.

According to some embodiments, determining whether redirecting the call would adversely affect the computing system may comprise determining whether the backup copy of the file is corrupt. In additional embodiments, determining whether redirecting the call would adversely affect the computing system may comprise determining whether redirecting the call would cause data loss, instability of the computing system, a configuration error, and/or an incompatibility. Determining whether redirecting the call would adversely affect the computing system may also comprise comparing the backup copy to a known good copy of the file, determining whether the contents of the backup copy of the file adhere to a specified file format, and/or scanning the backup copy of the file for malware. In addition, determining whether the call would adversely affect the computing system may comprise presenting the backup copy of the file to a user and receiving input from the user regarding the integrity of the backup copy of the file.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

I claim:

1. A computer-implemented method for safely restoring files in a computing system, the method comprising:
   identifying a backup copy of a file;
   creating a virtualization layer on a storage device of the computing system;
   restoring the backup copy of the file to a virtualized location within the virtualization layer on the computing system;
   intercepting a call initially directed to an original location of the file on the computing system;
   redirecting the call from the original location of the file on the computing system to the backup copy of the file restored to the virtualized location within the virtualization layer on the computing system;
   determining that redirecting the call to the backup copy of the file restored to the virtualized location within the virtualization layer on the computing system did not adversely affect the computing system;
   performing, based on the results of the determination, a file-system operation.

2. The computer-implemented method of claim 1, wherein performing the file-system operation comprises redirecting, to the virtualized location, subsequent calls directed to the original location.

3. The computer-implemented method of claim 1, wherein performing the file-system operation comprises restoring the backup copy of the file to the original location.

4. The computer-implemented method of claim 1, wherein determining that redirecting the call did not adversely affect the computing system comprises determining that the backup copy of the file is not corrupt.

5. The computer-implemented method of claim 1, wherein determining that redirecting the call did not adversely affect the computing system comprises determining that redirecting the call did not cause at least one of:
   data loss;
   instability of the computing system;
   a configuration error;
   an incompatibility.

6. The computer-implemented method of claim 1, wherein determining that redirecting the call did not adversely affect the computing system comprises at least one of:
- comparing the backup copy to a known good copy of the file;
- determining whether the contents of the backup copy of the file adhere to a specified file format;
- scanning the backup copy of the file for malware.

7. The computer-implemented method of claim 1, wherein determining that redirecting the call did not adversely affect the computing system comprises:
- presenting the backup copy of the file to a user;
- receiving input from the user regarding the integrity of the backup copy of the file.

8. The computer-implemented method of claim 1, wherein identifying the backup copy of the file comprises creating a backup copy of the file.

9. A system for safely restoring files, the system comprising a processor configured to execute one or more of:
- a virtualization module programmed to:
  - identify a backup copy of a file;
  - create a virtualization layer on a storage device of the system;
  - restore the backup copy of the file to a virtualized location within the virtualization layer on the system;
- a restoration module programmed to:
  - intercept a call initially directed to an original location of the file on the system;
  - redirect the call from the original location of the file on the system to the backup copy of the file restored to the virtualized location within the virtualization layer on the system;
  - determine that redirecting the call to the backup copy of the file restored to the virtualized location within the virtualization layer on the system did not adversely affect the system;
  - perform, based on the results of the determination, a file-system operation.

10. The system of claim 9, wherein the restoration module performs the file-system operation by redirecting, to the virtualized location, subsequent calls directed to the original location.

11. The system of claim 9, wherein the restoration module performs the file-system operation by restoring the backup copy of the file to the original location.

12. A non-transitory computer-readable-storage medium comprising one or more computer-executable instructions that, when executed by a processor of a computing device, cause the computing device to:
- identify a backup copy of a file;
- create a virtualization layer on a storage device of the computing device;
- restore the backup copy of the file to a virtualized location within the virtualization layer on the computing device;
- intercept a call initially directed to an original location of the file on the computing device;
- redirect the call from the original location of the file on the computing device to the backup copy of the file restored to the virtualized location within the virtualization layer on the computing device;
- determine that redirecting the call to the backup copy of the file restored to the virtualized location within the virtualization layer on the computing device did not adversely affect the computing device;
- perform, based on the results of the determination, a file-system operation.

13. The computer-implemented of claim 1, wherein the virtualized location comprises a private location within the virtualization layer on the computing system.

14. The computer-implemented method of claim 1, wherein the file-system operation ensures long-term restoration of the backup copy of the file.

15. The system of claim 9, wherein the virtualized location comprises a private location within the virtualization layer on the system.

16. The system of claim 9, wherein the file-system operation ensures long-term restoration of the backup copy of the file.

17. The system of claim 9, wherein the restoration module determines that redirecting the call did not adversely affect the system by determining that the backup copy of the file is not corrupt.

18. The system of claim 9, wherein the restoration module determines that redirecting the call did not adversely affect the system by determining that redirecting the call did not cause at least one of:
- data loss;
- instability of the system;
- a configuration error;
- an incompatibility.

19. The system of claim 9, wherein the restoration module determines that redirecting the call did not adversely affect the system by at least one of:
- comparing the backup copy to a known good copy of the file;
- determining whether the contents of the backup copy of the file adhere to a specified file format;
- scanning the backup copy of the file for malware.

20. The system of claim 9, wherein the restoration module determines that the call did not adversely affect the system by:
- presenting the backup copy of the file to a user;
- receiving input from the user regarding the integrity of the backup copy of the file.

* * * * *